May 21, 1940. H. KREIDEL 2,201,404
COUPLING FOR TUBES AND PIPES
Filed April 22, 1939
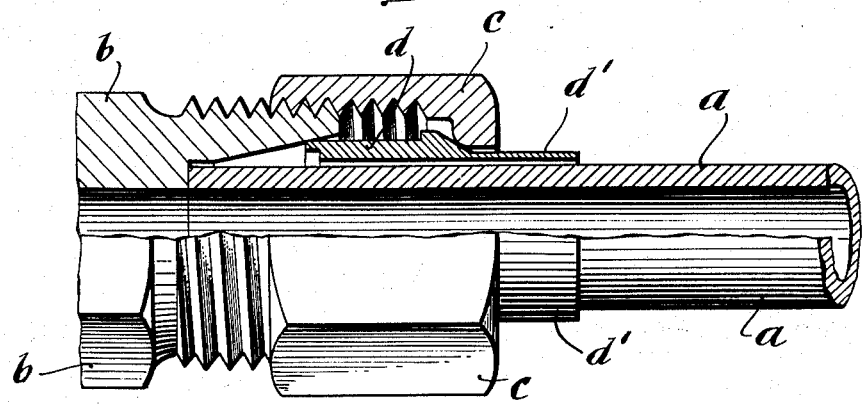
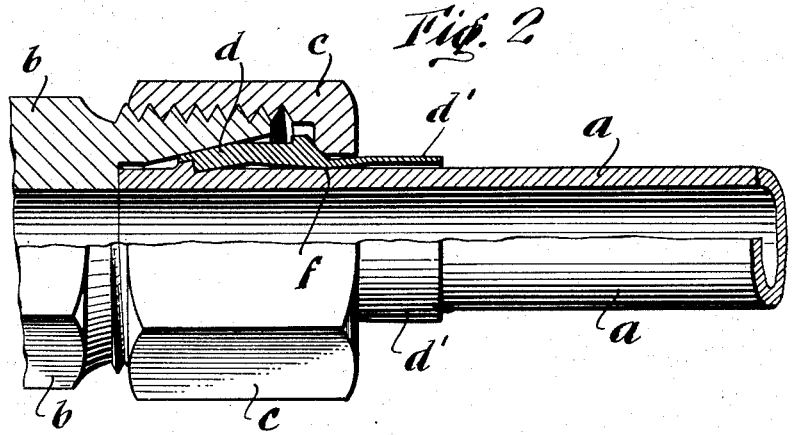
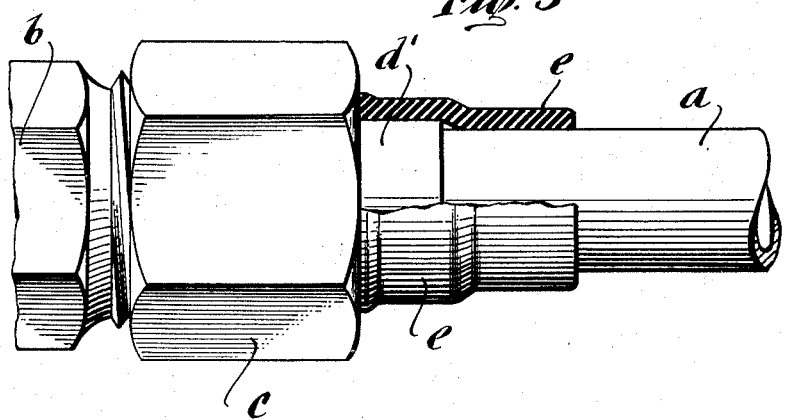
INVENTOR
*Hans Kreidel*
BY
*Cooper, Kerr + Dunham*
ATTORNEYS Patented May 21, 1940

2,201,404

UNITED STATES PATENT OFFICE 2,201,404

COUPLING FOR TUBES AND PIPES

Hans Kreidel, Wiesbaden, Germany, assignor to Patex Societe Anonyme, Basel, Switzerland, a corporation of Switzerland Application April 22, 1939, Serial No. 269,539
In Germany February 13, 1939

1 Claim. (Cl. 285—122)

This invention relates to improvements in pipe couplings of the general type shown in my United States Patent No. 2,139,413, dated December 6, 1938, and more particularly it relates to means for minimizing pipe fractures and preventing leakage should such fractures occur. It more particularly relates to an improved form of packing ring for use in couplings of the type described in the said patent.

Pipe couplings of said type are frequently utilized on pipes which are subject to constant vibration. For example, such couplings are used on fuel, oil or air piping of internal combustion engines. Experience has shown that pipe fractures sometimes occur after extended operation and such fractures are usually localized at the place where the pipe is gripped in the coupling, due to fatigue at such localized gripping point. Experience has further shown that the break or fracture usually occurs at the rear point where the packing ring is clamped against the pipe. Previous packing rings at the rear clamping point have a sharp edge which localizes the continuous bending stresses at a sharp place of transition between the vibrating free portion of the pipe and the immovable clamped end of the pipe. When such fractures occur, the medium within the pipe escapes to the air which, in most cases, interrupts the operation of the pipes on which the pipe coupling is used. Furthermore, such leakage is a source of danger with liquids or gases which are easily exploded or ignited.

The present invention has for its objects the provision of an improved coupling and improved form of ring which will not have the fracture localizing characteristics of former rings.

A further object of the present invention resides in the provision of a packing ring of improved form which will clamp the pipe over a considerable area.

A further object of the present invention resides in the provision of a coupling of such form together with a packing ring of such form that leakage will be minimized, if not prevented, even should a fracture occur.

A further object of the present invention resides in the provision of an improved form of coupling with supplemental sealing means adapted to afford a supplemental seal against leakage and also adapted to finish off the assembly and prevent loosening of the nut.

In accordance with the present invention, the packing ring, which acts as a cutting tool, is provided with a rearward cylindrical prolongation, whose outside diameter is smaller than the initial outer diameter of deflecting part of the ring that carries the cutting edge and which, when the screw joint is tightened up, extends a considerable distance beyond the outer nut. Because of its relatively small wall thickness, the packing ring's rearward prolongation, which begins at its rear constriction produced by the outer nut, participates in the deformation of the packing ring. The contact of the ring against the tube is in this way enlarged and terminates gradually and gently toward the rear, which considerably decreases the danger of a fracture of the tube. This prolonged part, moreover, in the event that the tube breaks where it is clamped, forms an effective protection against the medium which flows through the tube streaming out directly into the open air, because the medium is able to escape to only a small extent between the prolongation of the packing ring and the body of the tube end which remains stuck in it. In order to decrease this possibility still further, a surrounding or wound-on sleeve of flexible material, such as insulating tape, rubber, or the like, is preferably provided, which when the screw joint is tightened up covers the rearward prolongation of the packing ring that projects beyond the outer nut. The elastic sleeve not only acts to prevent the escape of medium from the pipe, but it has the additional advantage of acting as an auxiliary vibration damper. Such sleeve bears with its front end against the outer nut and acts to prevent the nut from becoming loose. Because the sleeve is put on after the outer nut is tightened up and is consequently the last operation in producing the screw joint, it, at the same time, forms a visible and consequently a particularly convenient way of checking termination of the installation.

Because of its good packing or sealing action, with very great elimination of the danger of fracture of pipe lines, as well as because of the supplementary protective means that the invention forms against rapid escape of the medium passing through the pipe should a fracture occur at the joint possibly through over-stressing, it is of great importance for advantageous use for fuel, oil and air pipe lines in the construction of aircraft and automobiles.

The drawing illustrates the invention in one form of construction in three stages during the tightening up of the packing ring.

Figure 1 shows the assembled pipe joint before tightening up the ring, half in section and half in elevation;

Fig. 2 shows the pipe joint after the ring has been tightened up, likewise half in section and half in elevation;

Fig. 3 shows the pipe joint with the ring tightened up in elevation with the surrounding sleeve pushed on, the latter, half in section and half in elevation.

In all illustrations $a$ indicates the pipe that is to be connected; $b$, the connecting piece proper; and $c$, the outer nut, which may be screwed onto the external screw threads of the connecting piece. $d$ is the packing ring, which in the manner disclosed in the main patent is formed as a cutting tool at its front end opposite the funnel-shaped enlargement of the connecting piece. It has a rear cylindrical prolongation $d^1$ of relatively thin wall thickness. In the tightened up state of the screw joint it extends a considerable way beyond the outer nut. It smaller in diameter than the initial outer diameter front part of the packing ring that carries the cutting edge. The rearward prolonged portion is also materially smaller than the ring part which is abutted and deformed by the outer nut $c$. By providing and proportioning the rearward prolongation in this manner the relatively thin prolongation may be readily deformed so that it may initially bear upon the pipe with a considerable contact area upon the pipe when the nut is tightened.

In Fig. 3, $e$ indicates an outer sleeve of flexible material, such as rubber or the like.

When the outer nut is tightened up, the packing ring $d$, which was previously pushed loosely over the pipe end that is to be packed, is pressed into the funnel-shaped enlargement of the connecting piece $b$ and hereby has its end deflected, whereby, while continuing its forward motion, it cuts, like a tool, with its cutting edge into the pipe body, while throwing up material. When the outer nut's resistance to tightening up increases, this nut exerts a radial pressure upon the tightly jammed packing ring, which tapers at its rear and runs into its rearward prolongation $d^1$, whereby there is constriction at $f$, which is transmitted to the rearward prolongation $d^1$ that begins here and which likewise deforms this prolonged thin part into a tight contact with the pipe body. The contact area of the packing ring against the pipe body is thus enlarged and made less localized. It is tightest at the constriction $f$ produced by the outer nut on the conical taper of the packing ring and gradually decreases from this zone toward both sides. The screw joint's resistance to vibration is hereby considerably increased so that with the workmanlike installation and normal operating conditions the danger of fracture may be regarded as practically eliminated.

The sleeve $e$, which after completion of the assembly, covers the transition of the rear ring prolongation $d^1$ to the pipe, may be formed as a wrapped sleeve by means of insulating tape subsequently applied round the pipe, or, as Fig. 3 shows, may form an outer sleeve that is pushed on to the pipe prior to the assembly of the screw joint in the form of a piece of rubber hose, and which after the screw joint is tightened up is pulled forward again until it bears against the outer nut and is above the projecting rearward end.

What is claimed is:

In a pipe joint having a socket with a flaring end and a pipe received therein, a packing ring received about said pipe, one end of said packing ring having a cutting edge adapted to be deflected into biting engagement with said pipe upon movement of said ring with respect to said flaring end, an intermediate enlargement on said packing ring, the other end of said packing ring presenting a relatively thin elongated sleeve portion having an external diameter smaller than that of the first said end, an inclined surface on said ring connecting said enlargement and said sleeve portion, a coupling element bearing upon said inclined surface, said coupling element having a minimum internal diameter appreciably greater than the external diameter of said sleeve portion, said sleeve portion extending along said pipe substantially beyond said coupling element, and means for drawing said coupling element and socket towards one another to urge said cutting edge into biting engagement with said pipe and to produce at a portion of said pipe spaced from said biting engagement, a binding engagement of relatively large area between said sleeve and said pipe in the region of said enlargement.

HANS KREIDEL.